United States Patent [19]

Martell

[11] Patent Number: 4,719,786

[45] Date of Patent: Jan. 19, 1988

[54] REINFORCED PLASTIC RETAINER RINGS FOR SHEET METAL FORMING AND METHOD OF MAKING

[75] Inventor: William A. Martell, Sterling Heights, Mich.

[73] Assignee: General Motors Corporation, Detroit, Mich.

[21] Appl. No.: 864,317

[22] Filed: May 19, 1986

[51] Int. Cl.⁴ .................. B21D 11/02; B29C 33/40
[52] U.S. Cl. ........................... 72/296; 72/351; 72/465; 264/225; 264/263; 264/277
[58] Field of Search ............... 72/296, 297, 304, 351, 72/302, 350, 360, 460; 264/225, 277, 272.15, 272.20, 334, 465, 275, 263; 425/123, DIG. 122

[56] References Cited

U.S. PATENT DOCUMENTS

| | | | |
|---|---|---|---|
| 2,058,938 | 10/1936 | Apple | 264/272.2 |
| 2,980,046 | 4/1961 | McGregor et al. | 72/350 |
| 3,088,174 | 5/1963 | Kolt | 18/59 |
| 3,101,065 | 8/1963 | Kalis | 113/49 |
| 3,108,853 | 10/1963 | Short et al. | 18/59 |
| 4,019,075 | 4/1977 | Kagami | 264/272.2 |
| 4,509,358 | 4/1985 | Krowl | 72/476 |

FOREIGN PATENT DOCUMENTS 28551  2/1982  Japan ................... 264/272.2

Primary Examiner—James Lowe
Attorney, Agent, or Firm—Randy W. Tung

[57] ABSTRACT

A reinforced plastic retainer ring for use in a sheet metal stretch forming process. The ring is reinforced with a plurality of metal brackets embedded in the rim portion generally radially aligned toward the center of the ring.

5 Claims, 5 Drawing Figures

REINFORCED PLASTIC RETAINER RINGS FOR SHEET METAL FORMING AND METHOD OF MAKING

FIELD OF THE INVENTION

The present invention generally relates to a reinforced plastic retainer ring for use in a sheet metal stretch forming process and, more particularly, is concerned with a plastic retainer ring reinforced with a plurality of reinforcing brackets for use in a sheet metal stretch forming process.

BACKGROUND OF THE INVENTION

In a sheet metal stretch forming process, a set of forming tools normally consists of four major pieces. They are a die, a punch, an upper retainer ring, and a lower retainer ring. The retainer rings are also known as binder rings. The upper and lower retainer rings are used in holding a sheet metal workpiece in place such that a die and a punch could work jointly to deform the workpiece into a desired shape. In a usual setup, the upper and lower retainer rings and the punch are movable while the die is stationary.

Traditionally, the retainer rings are machined of high strength tool steel. While the strength and durability of tool steel are adequate for sheet metal forming use, extensive machining is required to obtain the desired shape. As a consequence, it is very expensive to make a retainer ring with tool steel material. This machining cost becomes even more prohibitive when prototype low volume tools are made. In a prototype tool, many changes from the original design are made before a final design is reached. In the case of low volume tools such as that used in a limited production of a concept car, the tools must also be made inexpensively.

To save time and expenses involved in machining retainer rings in tool steel, attempts have been made to make retainer rings by casting a polymeric material. High strength polymeric materials such as thermoset epoxies have been used for this purpose. The major benefit realized in using cast epoxy retainer rings is that they may be cast to size saving the expenses of machining. However, while epoxy materials have good mechanical properties, we found that epoxies used alone without other reinforcement produced retainer rings that are easily failed after a few forming cycles. We have observed that most of the failures occurred at the rim portion, i.e., material immediately adjacent to the brim of the opening of the retainer ring. This is because in a sheet metal stretch forming process, the rim portion of the retainer ring which grips the edges of the metal sheet preventing it from slipping into the die cavity is subjected to very large radially inward stresses. As a consequence, chunks of epoxy material at the rim portion frequently broke away from the body portion of the retainer ring.

It is therefore an object of the present invention to provide a mechanically reinforced plastic retainer ring that can be used in a sheet metal stretch forming process without failure.

It is another object of the present invention to provide a metal bracket reinforced plastic retainer ring to be used in a sheet metal stretch forming process which can be made at low cost.

SUMMARY OF THE INVENTION

In accordance with a preferred practice of my invention, a reinforced plastic retainer ring can be made which is durable for thousands of cycles. My novel invention comprises a plurality of spaced apart reinforcing members each having a projected finger portion extended into and embedded within the rim portion of the retainer ring and an elongated portion extended from the finger portion into the body portion of the retainer ring. This plurality of spaced apart reinforcing members enable the distribution of the large substantially radially inward stresses acting on the rim portion to the body portion of the retainer ring during a sheet metal stretch forming process. This stress distribution alleviates the large stress concentration in the rim portion which would otherwise occur and cause failure without such reinforcing members. A reinforced plastic retainer ring made in accordance with my novel invention can be used in a sheet metal stretch forming process up to several thousands of cycles without failure.

Other objects, features and advantages of the present invention will become apparent upon consideration of the drawings and specification that follows:

DETAILED DESCRIPTION OF THE PREFERRED EMBODIMENT

Figure 1:
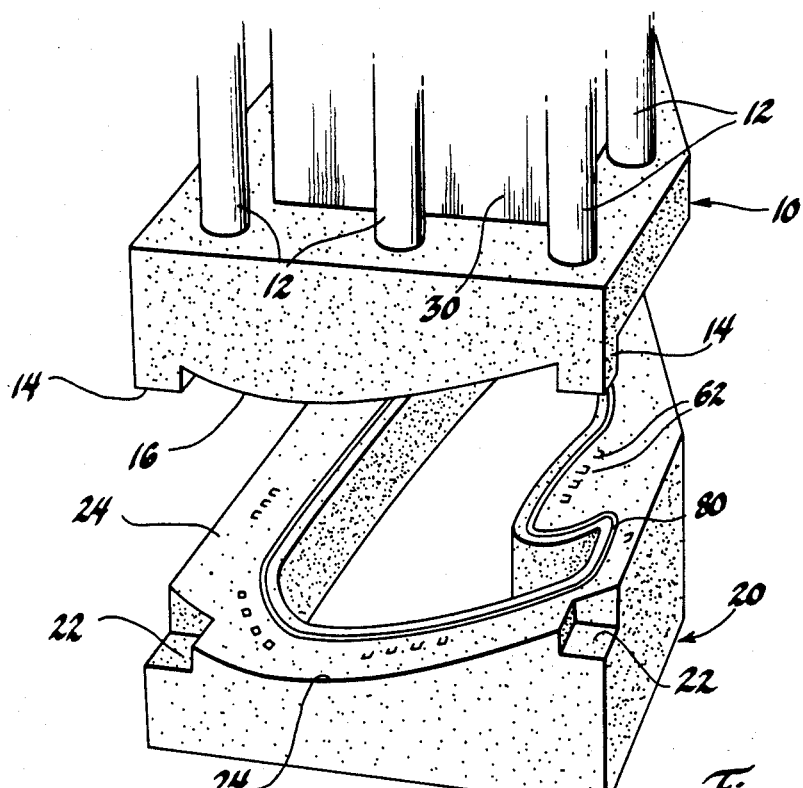
FIG. 1 is a perspective view of a tooling arrangement used in sheet metal stretch forming processes showing a punch, an upper retainer ring and a lower retainer ring.

Referring initially to FIG. 1, a tooling setup for a sheet metal stretch forming process is shown. An upper retaining ring 10 is mounted on hydraulic cylinders 12 for vertical movement. Anchors 14 are located at the four corners for alignment purpose into seats 22 in lower retainer ring 20. Punch 30 is partially shown in FIG. 1 located inside the upper retainer ring 10. Upper retainer ring 10 has a working surface 16 which mates with working surface 24 on the lower retainer ring 20. It should be noted that a die member is not shown in FIG. 1 which is normally located inside the opening of the lower retainer ring 20.

Figure 2:
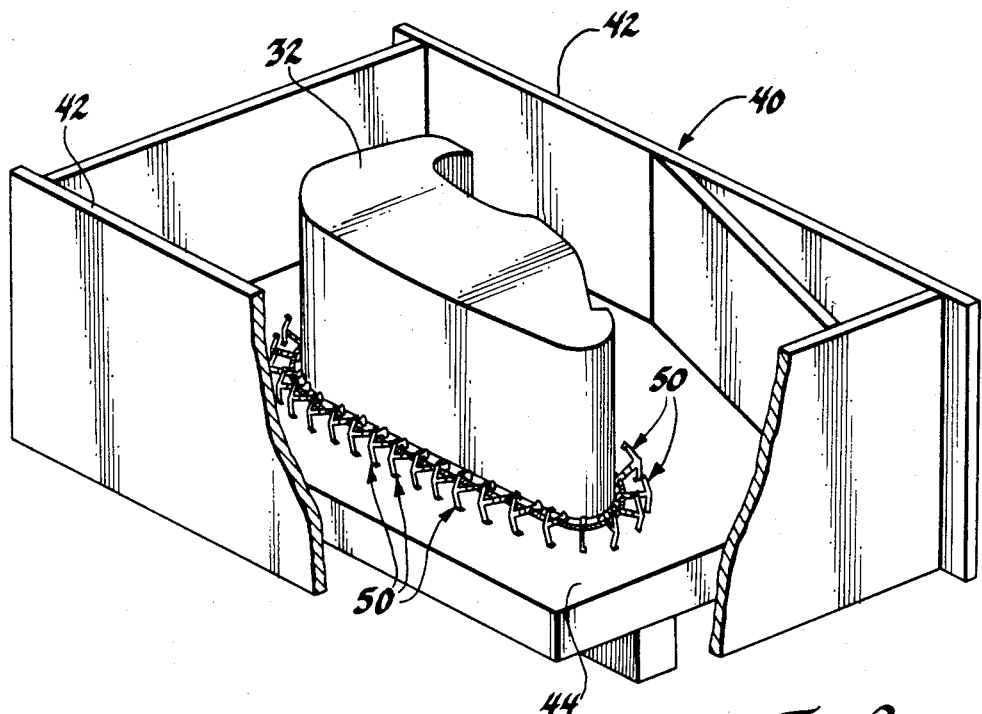
FIG. 2 is a perspective view of a pattern box containing a pattern and a plurality of reinforcing members connected by a flexible wire prior to the casting of epoxy.

FIG. 2 shows pattern 32 having the shape and contour of a die positioned in pattern box 40 prior to casting. The walls 42 of pattern box 40 define the exterior surfaces of the lower retainer ring 20 after casting. A plurality of reinforcing members 50 which are typically stamped cold rolled steel are placed on base 44 of pattern box 40 and radially aligned toward the center of pattern 32. The reinforcing brackets 50 are placed at a distance of approximately between 1 and 2 inches apart with the finger portion adjacent to the pattern. In my preferred embodiment, the brackets are connected through an aperture at the finger portion of the bracket by a flexible wire. After the reinforcing brackets are positioned in place, other reinforcing means such as steel rods, steel mesh, and particulate reinforcement such as rocks are also placed in the box before an epoxy casting compound is poured into the box. A detailed description of a method to reinforce a plastic die with steel rods, steel meshes, and particulate fillers is given in U.S. Pat. No. 4,601,867, issued July 22, 1986 assigned to the assignee of this invention, and which is incorporated here by reference. Any suitable high strength epoxy casting composition may be used in the casting of retainer rings. A release coating is normally applied to the surface of the pattern and the box so that the retainer ring may be easily separated from the pattern and the box after casting. While my reinforcing brackets 50 function mainly as reinforcement for the rim portion of the retainer ring, other reinforcements such as steel rods, steel meshes, and particulate fillers are used for two reasons. First, they reinforce the body portion of the retainer ring for structural strength. Secondly, the addition of these reinforcements enable minimal shrinkage of the epoxy casting compound such that a cast-to-size epoxy retainer ring may be made.

Figure 3:
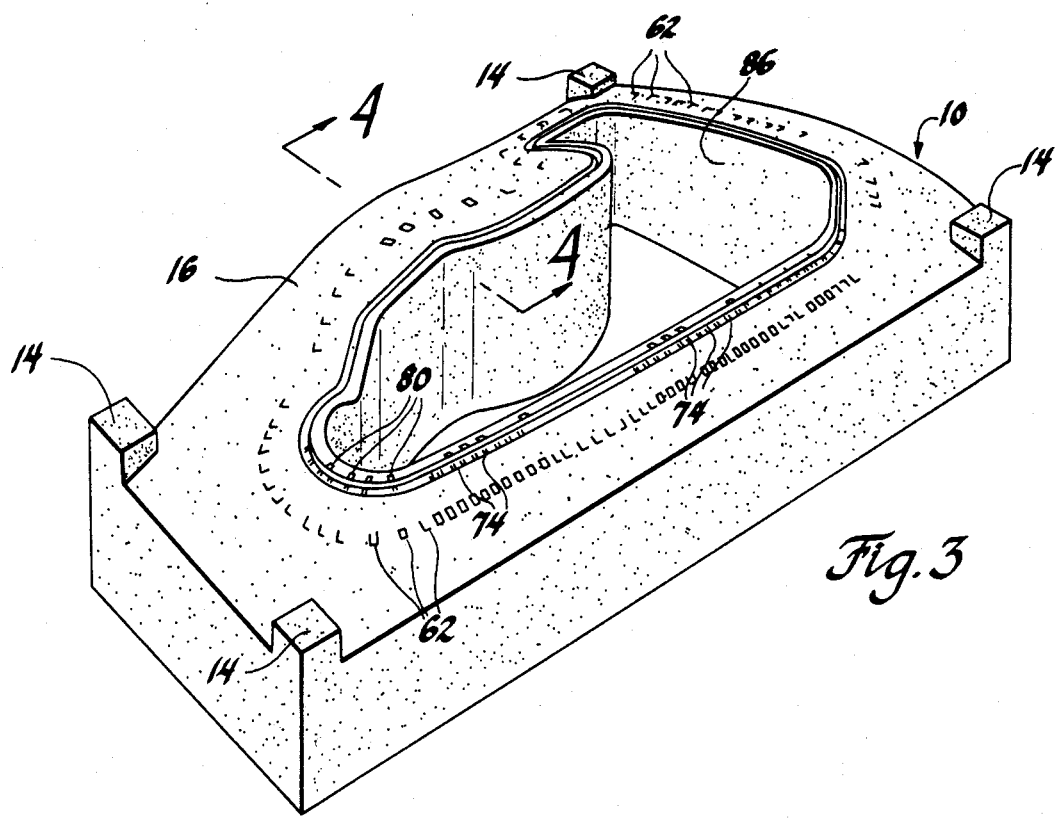
FIG. 3 is a perspective view of a finished lower retainer ring containing the reinforcing members.
Figure 5:
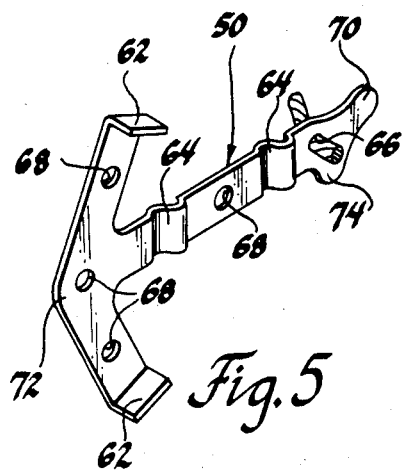
FIG. 5 is an isometric view of a reinforcing member having tabs, apertures, and corrugated sections.
Figure 4:
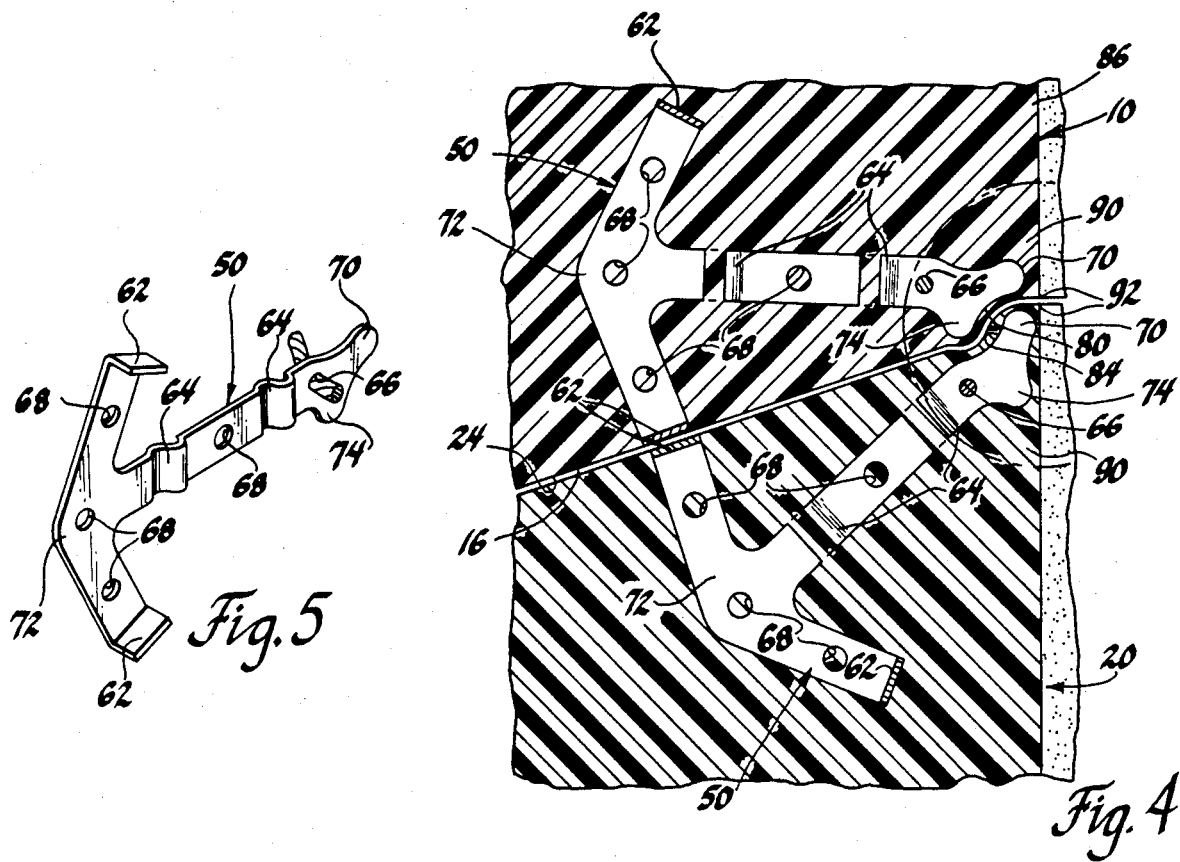
FIG. 4 is a sectional view 4—4 taken from FIG. 3 showing the reinforcing members embedded in the retainer rings.

A completed upper retainer ring 10 is shown in FIG. 3. Section 4—4 in FIG. 3 is shown in FIG. 4. Note that area 90 enclosed by the dashed line which is the area immediately adjacent to brim 92 is defined as the rim portion of the retainer ring. An isometric view of the reinforcing bracket is shown in FIG. 5. Note that in FIG. 5, reinforcing bracket 60 contains two tab sections 62, two corrugated sections 64, and five apertures 66 and 68. These are locking means for preventing relative movement between the reinforcing brackets and the epoxy medium of the retainer ring after casting. The reinforcing bracket 60 further contains a projected finger section 70 and an extended body section 72.

Referring now to FIG. 3, profiles of the embedded reinforcing brackets are shown at the tabs 62 and the projected fingers 74. A beaded, curved section 80 (FIG. 3 and FIG. 4) which surrounds the opening of retainer ring 10 works in cooperation with the beaded, curved section 84 (FIG. 4) in the mating retainer ring 20 for the gripping of a metal sheet workpiece. Punch 30 (FIG. 1) slides against the inner surface 86 (FIG. 3) during a stretch forming process.

In my preferred embodiment, a flexible metal wire is used to loosely link the reinforcing brackets through aperture 66 (FIG. 5) in a shish kebab configuration for easier maneuverability. After the retainer ring is cast, the metal wire is fixed to each reinforcing bracket by the epoxy and acts as means for stress transmission such that the stresses acting on one reinforcing bracket may be distributed to its adjacent brackets. Furthermore, the radially inward stresses exerted on the rim portion of the retainer ring by the sheet metal workpiece is distributed to the body portion of retainer ring by stress transfer from the finger portion 70 to the body portion 72. This stress distribution and transfer alleviate the stress concentrations which would otherwise occur at the rim portion of the retainer ring without such reinforcing brackets. As a consequence, the possibility of breakage or failure of the retainer ring at its rim portions is eliminated.

While my invention has been described in terms of one preferred embodiment thereof, other forms could be readily adapted by one skilled in the art to achieve the same results.

The embodiments of the invention in which an exclusive property or privilege is claimed are defined as follows:

1. A plastic retainer ring, used to secure a workpiece in a sheet metal stretch forming process, said ring having a body portion with an opening therein for receiving a forming die, said body being formed of a polymeric material and including a rim portion defining said opening, said rim portion being subject to large substantially radially inward stresses during said stretch forming process, said rim comprising a plurality of spaced part, generally radially aligned reinforcing members having a projected finger portion extended into and embedded within said rim portion and an elongated portion extended from said finger portion into said body portion of the retainer ring, a working surface containing a beaded, curved section for securing said sheet metal workpiece, whereby said large substantially radially inward stresses acting on said rim portion during said stretch forming process are alleviated by the stress distribution from said rim portion to said body portion through the reinforcing members.

2. A plastic retainer ring, used to secure a workpiece in a sheet metal stretch forming process, said ring having a body portion with an opending therein for receiving a forming die, said body being formed of a polymeric material and including a rim portion defining said opening, said rim portion being subject to substantially radially inward stresses during said stretch forming process, said rim comprising a plurality of spaced apart, generally radially aligned reinforcing members having a projected finger portion extended into and embedded within said rim portion and an elongated portion extended from said finger portion into said body portion of the retainer ring having locking means for preventing relative movement between said reinforcing member and said retainer ring, a working surface containing a beaded, curved section for securing said sheet metal workpiece, whereby said substantially radially inward stresses acting on said rim portion during said stretch forming operation are alleviated by the stress distribution from said rim portion to said body portion through the reinforcing members.

3. A plastic retainer ring, used to secure a workpiece in a sheet metal stretch forming process, said ring having a body portion with an opening therein for receiving a forming die, said body being formed of a polymeric material and including a rim portion defining said opening, said rim portion being subject to substantially radially inward stresses during said stretch forming process, said rim comprising a plurality of spaced apart, generally radially aligned reinforcing members having a projected finger portion extended into and embedded within said rim portion and an elongated portion extended from said finger portion into said body portion of the retainer ring having locking means including apertures, tabs and corrugated sections for preventing relative movement between said reinforcing member and said retainer ring, a working surface containing a beaded, curved section for securing said sheet metal workpiece, whereby said substantially radially inward stresses acting on said rim portion during said stretch forming operation are alleviated by the stress distribution from said rim portion to said body portion through the reinforcing members.

4. A plastic retainer ring, used to secure a workpiece in a sheet metal stretch forming process, said ring having a body portion with an opening therein for receiving a forming die, said body being formed of a polymeric material and including a rim portion defining said opening, said rim portion being subject to substantially radially inward stresses during said stretch forming process, said rim comprising a plurality of spaced apart, generally radially aligned reinforcing members having a projected finger portion extended into and embedded within said rim portion and an elongated portion extended from said finger portion into said body portion of the retainer ring, a working surface containing a beaded, curved section for securing said sheet metal workpiece, said reinforcing members having locking means including apertures, tabs and corrugated sections for preventing relative movement between said reinforcing member and said retainer ring, and a wire member linking said reinforcing members through said apertures in a shish kebab configuration whereby said substantially radially inward stresses acting on said rim portion during said stretch forming operation are alleviated by the stress distribution from said rim portion to said body portion through the reinforcing members.

5. A method of casting a reinforced plastic retainer ring for use in securing a workpiece in sheet metal stretch forming process including the steps of providing a pattern of a die having an exterior surface defining the interior surface of said retainer ring; orienting said pattern in a pattern box the interior surface of which defines the exterior surfaces of said retainer ring; applying a release coating to the surfaces of the pattern and the box; assembling and placing a plurality of spaced apart, generally radially aligned reinforcing members into said pattern box along the periphery of said pattern, said reinforcing members having projected finger portions equipped with apertures which are positioned adjacent to the pattern; connecting said reinforcing members through said apertures with a flexible wire member; pouring a polymeric casting compound into said pattern box and demolding said retainger ring after fully cured.

* * * * *